United States Patent [19]

Sanders

[11] Patent Number: 4,531,274
[45] Date of Patent: Jul. 30, 1985

[54] UNLATCHING TOOL TO UNCOUPLE SEMI-TRAILER TRUCKS

[76] Inventor: Joseph E. Sanders, 622 Montrose, Romeoville, Ill. 60441

[21] Appl. No.: 561,420

[22] Filed: Dec. 14, 1983

[51] Int. Cl.³ .............................................. B23P 19/04
[52] U.S. Cl. ......................................... 29/267; 29/278
[58] Field of Search .................. 294/12, 14, 9, 17, 18; 280/433; 29/267, 278; 254/25, 131; 81/177 A, 177 PP

[56] References Cited

U.S. PATENT DOCUMENTS

| | | | |
|---|---|---|---|
| 262,346 | 8/1882 | Barrett et al. | 294/18 |
| 1,169,496 | 1/1916 | Knauff | 81/177 PP |
| 2,072,391 | 3/1937 | Varney | 294/18 |
| 2,739,330 | 3/1956 | Hitchcock | 294/12 |

*Primary Examiner*—Robert C. Watson
*Attorney, Agent, or Firm*—Ernest Kettelson

[57] ABSTRACT

An unlatching tool to uncouple the trailer from the tractor of semi-trailer truck rigs, comprising a foldable elongated bar having a hand grasp at one end and a combination safety release arm plus unlatching hook at the opposite working end. The safety release arm extends at a right angle from the working end of the bar and in one direction from the bar, while the unlatching hook extends outwardly from the bar in the opposite direction and set back from the working end a short distance. When the unlatching hook engages the coupling latch which locks the king pin of the trailer to the tractor, the safety release arm extends forward of the unlatching hook just far enough to bear against the safety release mechanism which can be moved to the safety release position by a partial rotation or twist of the bar while at the same time pulling on the bar to draw the coupling latch to the unlatched position. The trailer can then be uncoupled from the tractor. The previous way of unlatching the coupling mechanism was to reach under the trailer to grasp the latch by hand, and at the same time try to hold the safety in the release position. The elongated bar is pivoted in the center so it can be folded to a convenient length for drivers to carry with them as a personal item for use with whatever rig they may be assigned to drive.

8 Claims, 5 Drawing Figures

UNLATCHING TOOL TO UNCOUPLE SEMI-TRAILER TRUCKS

BACKGROUND OF THE INVENTION

This invention relates to the field of special tools designed for a single purpose use. In this case, the tool is made for the specific purpose of enabling truck drivers to unlatch the coupling mechanism of semi-trailer trucks without having to reach way under the trailer to do it by hand with all of the problems and risks which that entails.

No prior art of any kind is known to the inventor of a tool that is able to do this particular function. The only presently known prior art way of doing it is by hand.

While attempting to locate prior art tools which could do this particular job, several other kinds of single purpose tools were found that were made to do other and different single purpose tasks, including the drain cock wrench disclosed in U.S. Pat. No. 2,138,725; the jack handle disclosed in U.S. Pat. No. 1,612,446; another kind of jack handle disclosed in U.S. Pat. No. 1,582,889; a complete vehicle jack and handle disclosed in U.S. Pat. No. 1,531,732; another jack with another specially designed handle for use with that particular jack disclosed in U.S. Pat. No. 1,225,822; and still another jack with a still different single purpose jack handle for use specifically with that jack as shown in U.S. Pat. No. 1,207,519. Nothing even remotely similar to a tool which can unlatch the coupling mechanism of a semi-trailer truck and at the same time hold the safety mechanism in the latch release position has been found in the prior art or known to the inventor.

SUMMARY OF THE INVENTION

It is an object of the invention to provide an unlatching tool to uncouple the trailer from the tractor in semi-trailer truck rigs without having to reach way under the trailer to grasp the unlatching mechanism by hand.

It is an object of the invention to provide an unlatching tool to uncouple the trailer from the tractor in semi-trailer truck rigs, which includes both a safety release arm and an unlatching hook at the working end of the tool.

It is an object of the invention to provide an unlatching tool to uncouple the trailer from the tractor in semi-trailer truck rigs, which tool comprises an elongated bar enabling the driver to reach the unlatching mechanism with the working end of the tool from a position alongside the trailer rather than having to reach under the trailer.

It is an object of the invention to provide an unlatching tool to uncouple the trailer from the tractor in semi-trailer truck rigs, which tool comprises an elongated bar pivotally hinged at the mid-region for folding the tool into a short compact item which can be easily carried by the truck driver as a personal item for use with any truck rig he may be assigned to drive.

DESCRIPTION OF PREFERRED EMBODIMENT

Figure 1:
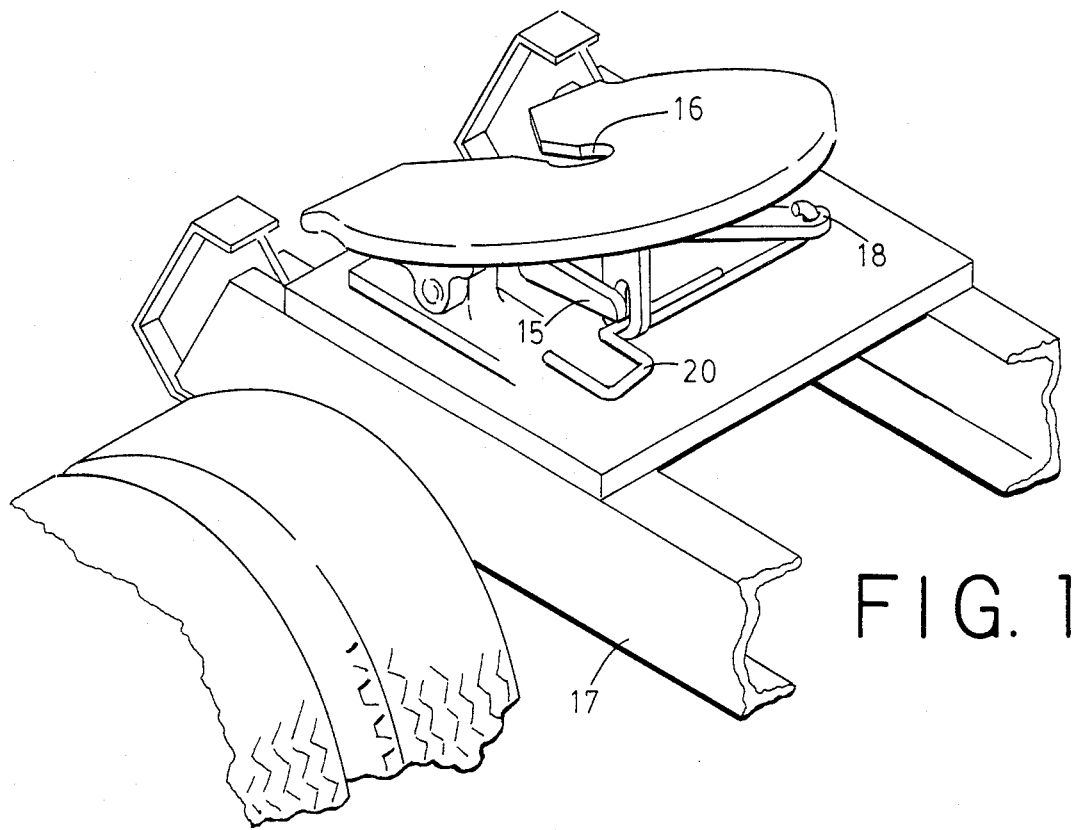
FIG. 1 is a perspective view from a front angle of a rear portion of a tractor for use with a semi-trailer, showing the latch release handle and the safety release lug which must be lifted before the latch release handle can be moved to the latch release position.
Figure 2:
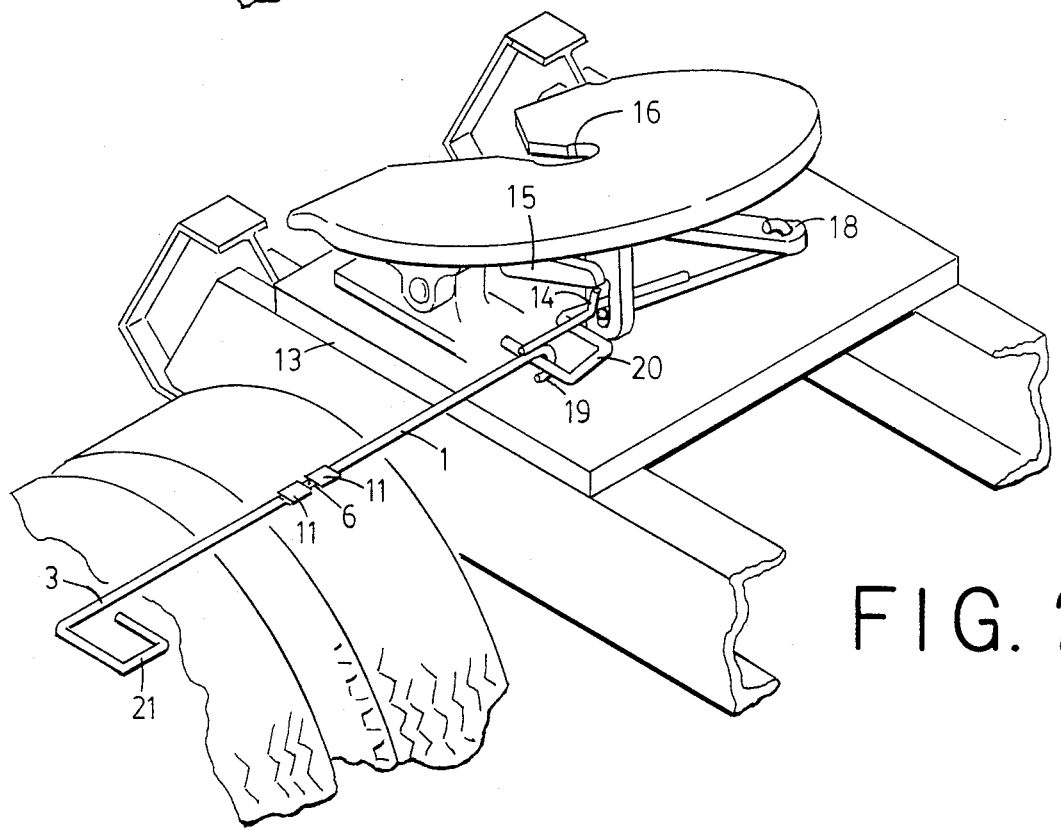
FIG. 2 is a perspective view from the side showing the tool in accordance with this invention engaging both the latch release handle and the safety release lug.
Figure 3:
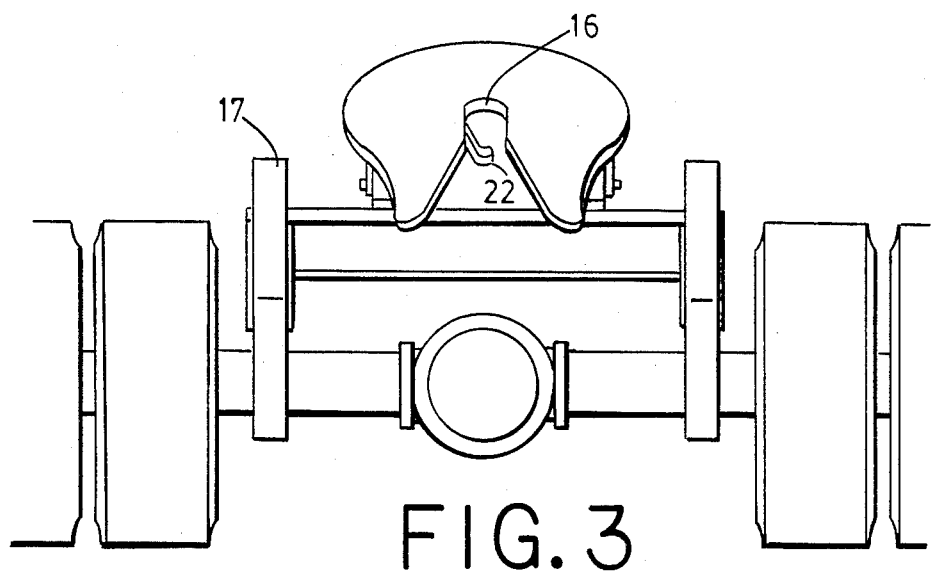
FIG. 3 is a perspective view from the rear showing the swivel plate and coupling yoke which receives the king pin of the trailer and locks it in place when fully coupled to the tractor, release of such yoke for uncoupling of the trailer being controlled by the latch release handle shown in FIG. 1.
Figure 4:
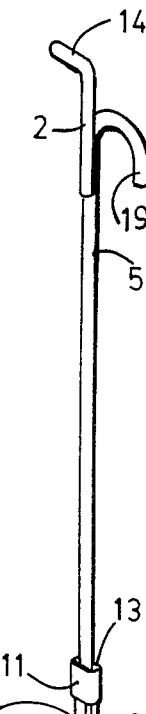
FIG. 4 is a side elevation view of the tool in accordance with this invention shown in its extended position.
Figure 5:
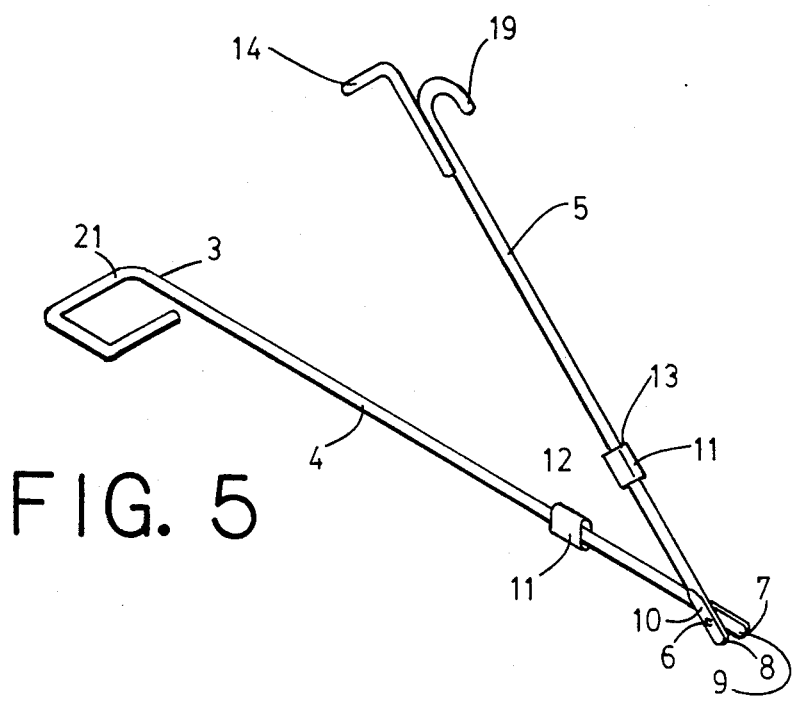
FIG. 5 is a side elevation view of the tool in accordance with this invention shown in its folded position.

An unlatching tool to uncouple the trailer from the tractor of a semi-trailer truck rig includes an elongated bar 1 having a working end 2 and a hand grasp end 3. The elongated bar comprises two sections, a rearward section 4 terminating at the hand grasp section 3, and a forward section 5 terminating at the working end 2.

The rearward section 4 and forward section 5 are about equal length, and are pivotally joined by a pivot pin 6 at their respective connecting ends 7 and 8. The sections 4 and 5 of the elongated bar 1 are of generally cylindrical cross-section, but the respective connecting end regions 9 and 10 are flattened to facilitate folding the elongated bar 1 to a folded position in which section 4 is in substantially side-by-side relationship with section 5. In the folded position, the tool in accordance with this invention is short enough to be easily carried by a truck driver as his own personal item which he can keep with him for use with whatever truck-trailer rig he may be assigned to drive. The tool is universally useable with truck-trailer rigs of almost all makes and models.

The overall length of the tool is about thirty four inches in its extended position, each section 4 and 5 being therefore about seventeen inches in length from the connecting pivot point at pivot pin 6 to their respective outer end. The tool may be somewhat longer or shorter, but thirty four inches is a convenient and desired or preferred length.

A locking sleeve 11 is provided to lock the elongated bar 1 in its extended position. The locking sleeve 11 comprises a tubular member having an elongated peripheral wall 12 defining a central cavity 13 having a cross-sectional shape and dimension corresponding to that of the flattened end regions 9 and 10 of the bar sections 4 and 5 when the bar is in its extended position and the flattened end regions 9 and 10 are in side by side relationship. The locking sleeve 11 is permanently mounted for sliding back and forth on one of the bar sections 4 or 5, into locking relationship with the flattened end regions 9 and 10 thereof when the bar 1 is in its extended position and out of locking relationship therewith after which the bar sections 4 and 5 can be pivoted to the folded position.

A second locking sleeve 11 can be provided, one mounted on each bar section 4 and 5 for sliding into locking relationship with the flattened end region 9 and 10 therefof on both sides of the pivot pin 6.

The working end 2 of the bar 1 includes a safety release arm 14 at the very end which extends outwardly from the bar 1 in one direction at substantially a right angle for a distance of about an inch and a quarter to an inch and a half, or whatever distance is necessary to reach and engage the safety release lug 15 of the coupling mechanism 16 on the tractor 17, when the bar 1 is in position to unlatch the latch release mechanism 18.

The working end 2 of the bar 1 also includes an unlatching hook 19, positioned inwardly from the safety arm 14 a short distance, which may be about two inches, and which extends outwardly from the bar 1 in a direction opposite from that of the safety release arm 14. The unlatching hook 19 is spaced apart inwardly from the safety release arm whatever distance is necessary for the safety release arm to be in operating contact with the safety release lug 15 when the unlatching hook 19 is in hooked engagement with the latch release handle 20 of the coupling mechanism 16. Such distance is preferably about two inches, to enable universal use of this tool with most makes and models of semi-trailers and tractors.

The hand grasp end 3 of the bar 1 includes an integrally formed hand grasp 21 comprising a loop extending outwardly from the rearward bar section 4 with which it is integrally formed.

To use the unlatching tool described herein, it is first pivoted to its extended position and the sleeve or sleeves 11 slide into locking position over the side-by-side flattened end regions 9 and 10 of the bar sections 4 and 5 which are now in the axially aligned or extended position. The driver grasps the hand grasp 21 in one hand and extends the working end 2 of the bar 1 inwardly under the trailer (not shown) to hook the unlatching hook 19 over the latch release handle 20, at which time the safety release arm 14 can be manipulated to engage the safety release lug 15. The driver then twists or rotates the bar 1 to move the safety release arm 14 of the bar against the safety release lug 15 causing it to move enough to release the safety mechanism whereby the latch mechanism can be moved to the unlatched position. The driver then at the same time pulls on the bar 1 which causes the unlatching hook 19 to pull the latch release handle 10 toward the unlatched position of the latch mechanism, whereupon the coupling shackle 22 of the coupling mechanism 16 of the tractor 17 can be pivoted to the release or uncoupling position. The trailer can then be uncoupled from the tractor. The tool is then unhooked from the latch release handle, withdrawn by the driver who can then slide the locking sleeves 11 out of their locking position on the bar 1, whereupon the bar may be folded on the pivot pin 6 to its compact, shortened and folded position.

I claim:

1. An unlatching tool to uncouple the trailer from the tractor of a semi-trailer truck rig, comprising an elongated bar having a first working end region and a second opposite end region, said first working end region including safety release means to release a safety mechanism which prevents unlatching of the coupling mechanism that couples a said trailer to a said tractor of a semi-trailer truck rig until such safety mechanism has been released, said safety release means including a straight arm extending outwardly in one direction away from the longitudinal axis of said elongated bar, and an unlatching hook to unlatch said coupling meachanism to enable uncoupling of said trailer from said tractor, said unlatching hook including a curved return portion extending in a direction back toward said second end region of said elongated bar, said unlatching hook extending outwardly away from the longitudinal axis of said elongated bar in the opposite direction from that in which said straight arm extends and from a location on said elongated bar which is spaced apart inwardly thereof from the location of said straight arm.

2. An unlatching tool to uncouple the trailer from the tractor of a semi-trailer truck rig as set forth in claim 1, wherein said elongated bar includes a first elongated section terminating at said first end region, a second elongated section terminating at said second end region, said first and second elongated sections being pivotally connected for pivotal movement between an extended position and a folded position, and pivot means to pivotally connect said first elongated section to said second elongated section.

3. An unlatching tool to uncouple the trailer from the tractor of a semi-trailer truck rig as set forth in claim 2, including lock means to lock said extended bar in said elongated position.

4. An unlatching tool to uncouple the trailer from the tractor of a semi-trailer truck rig in combination with the coupling mechanism of said semi-trailer truck rig, said coupling mechanism including a latching mechanism to prevent uncoupling of said trailer from said tractor until said latching mechanism is released, a safety release mechanism to prevent unlatching of said latching mechanism until said safety release mechanism is released, said safety release mechanism including a safety release lug movable between a safety locked position and a safety release position, said latching mechanism including a latch release handle spaced apart from said safety release lug a predetermined distance, said unlatching tool comprising an elongated bar having a first working end region and a second opposite end region, said first working end region including a safety release arm extending outwardly in one direction away from the longitudinal axis of said elongated bar, an unlatching hook spaced apart from said safety release arm, said unlatching hook extending outwardly in a different direction away from said longitudinal axis of said elongated bar, said safety release arm and said unlatching hook being spaced apart said same pre-determined distance whereby said safety release arm engages said safety release lug for movement from said safety locked position to said safety release position when said unlatching hook engages said latch release handle to move said latching mechanism from its latched position to its unlatched position.

5. An unlatching tool to uncouple the trailer from the tractor of a semi-trailer truck rig as set forth in claim 4, wherein said safety release arm is straight and extends outwardly from said first end region of said elongated bar in said one direction at a substantially right angle, said unlatching hook extends outwardly from said first end region of said elongated bar in the opposite direction and is spaced inwardly of said bar from said safety release arm.

6. An unlatching tool to uncouple the trailer from the tractor of a semi-trailer truck rig as set forth in claim 5, wherein said second opposite end region includes a handle thereon for grasping by the driver to seat said hook in said latch release handle, to position said arm against said safety release lug and to then manipulate said tool to move said safety release lug to said safety release position while moving said latch release handle to said unlatched position.

7. An unlatching tool to uncouple the trailer from the tractor of a semi-trailer rig as set forth in claim 3, wherein said first and second elongated sections include corresponding connecting end regions, said lock means including at least one locking sleeve movable into position to receive a portion of said connecting end regions of both of said first and second sections in said locking sleeve when said first and second sections are pivoted to said extended position thereby locking said first and second sections in said extended position.

8. An unlatching tool to uncouple the trailer from the tractor of a semi-trailer truck rig as set forth in claim 7, wherein said locking sleeve is slidingly mounted on said second section of said elongated bar, said second locking sleeve also being movable into position to receive a portion of said connecting end regions of both of said first and second sections therein when said sections are pivoted to said extended position thereby providing additional locking means to lock said first and second sections in said extended position.

* * * * *